United States Patent
Schmidlin et al.

(10) Patent No.: US 12,121,062 B2
(45) Date of Patent: Oct. 22, 2024

(54) OPTICAL VAPORISATION SYSTEM FOR AN ELECTRONIC CIGARETTE

(71) Applicant: JT International S.A., Geneva (CH)

(72) Inventors: Moritz Schmidlin, Dietikon (CH); Damir Luso, Schlieren (CH); Roberto Franz, Nyon (CH)

(73) Assignee: JT International S.A. (CH)

( * ) Notice: Subject to any disclaimer, the term of this patent is extended or adjusted under 35 U.S.C. 154(b) by 831 days.

(21) Appl. No.: 17/252,578

(22) PCT Filed: Jun. 14, 2019

(86) PCT No.: PCT/EP2019/065698
§ 371 (c)(1),
(2) Date: Dec. 15, 2020

(87) PCT Pub. No.: WO2020/002005
PCT Pub. Date: Jan. 2, 2020

(65) Prior Publication Data
US 2021/0251293 A1      Aug. 19, 2021

(30) Foreign Application Priority Data

Jun. 26, 2018  (EP) .................................... 18179733

(51) Int. Cl.
*A24F 40/46*       (2020.01)
*A24F 40/42*       (2020.01)
(Continued)

(52) U.S. Cl.
CPC .............. *A24F 40/46* (2020.01); *A24F 40/42* (2020.01); *A24F 40/44* (2020.01); *A24F 40/48* (2020.01);
(Continued)

(58) Field of Classification Search
CPC .......... A24F 40/46; A24F 40/42; A24F 40/44; A24F 40/48; A24F 40/50; A24F 47/00;
(Continued)

(56) References Cited

U.S. PATENT DOCUMENTS

2017/0127722 A1*  5/2017  Davis ...................... A24F 40/95
2019/0059444 A1*  2/2019  Cyphert ............... A61M 11/042

FOREIGN PATENT DOCUMENTS

CN         104856235 A   *   8/2015
CN         207075556 U       3/2018
(Continued)

OTHER PUBLICATIONS

Extended European Search Report including Written Opinion for Application No. EP18179733.3, dated Dec. 7, 2018, pp. 1-5.
(Continued)

*Primary Examiner* — Justin M Kratt
(74) *Attorney, Agent, or Firm* — Lerner David LLP

(57) ABSTRACT

An electronic cigarette includes a laser and a light guide. A reservoir is provided for storing a vaporisable liquid. An absorber is provided to absorb light emitted by the laser and to generate heat. An optical interface is provided at a second end face of the light guide, and a flow path is provided for vaporisable liquid to flow from the reservoir towards the optical interface at the second end face and the absorber. The optical interface selectively reflects or refracts light emitted by the laser such that light emitted by the laser is coupled towards the absorber when liquid is present at the optical interface and light emitted by the laser is coupled away from the absorber when liquid is not present at the optical interface.

19 Claims, 13 Drawing Sheets

(51) Int. Cl.
  *A24F 40/44* (2020.01)
  *A24F 40/48* (2020.01)
  *A24F 40/50* (2020.01)
  *A24F 47/00* (2020.01)
  *A24F 7/00* (2006.01)
  *A24F 40/10* (2020.01)
  *A24F 40/485* (2020.01)
  *A24F 40/51* (2020.01)
  *A24F 40/60* (2020.01)
  *H01S 3/00* (2006.01)

(52) U.S. Cl.
  CPC .............. *A24F 40/50* (2020.01); *A24F 47/00* (2013.01); *A24F 7/00* (2013.01); *A24F 40/10* (2020.01); *A24F 40/485* (2020.01); *A24F 40/51* (2020.01); *A24F 40/60* (2020.01); *H01S 3/00* (2013.01)

(58) Field of Classification Search
  CPC .......... A24F 7/00; A24F 40/10; A24F 40/485; A24F 40/51; A24F 40/60; H01S 3/00
  See application file for complete search history.

(56) References Cited

FOREIGN PATENT DOCUMENTS

| | | | |
|---|---|---|---|
| EP | 3075270 A1 * | 10/2016 | ........... A24F 47/008 |
| KR | 20160134582 A | 11/2016 | |
| WO | 2017182554 A1 | 10/2017 | |

OTHER PUBLICATIONS

International Search Report including Written Opinion for Application No. PCT/EP2019/065698, mailed Sep. 23, 2019, pp. 1-12.

* cited by examiner

OPTICAL VAPORISATION SYSTEM FOR AN ELECTRONIC CIGARETTE

CROSS-REFERENCE TO RELATED APPLICATIONS

The present application is a national phase entry under 35 U.S.C. § 371 of International Application No. PCT/EP2019/065698, filed Jun. 14, 2019, published in English, which claims priority to European Application No. 18179733.3 filed Jun. 26, 2018, the disclosures of which are incorporated herein by reference.

BACKGROUND OF THE INVENTION

The present invention relates to a system and method for vaporising liquid in an electronic cigarette using a light source such as a laser.

Electronic cigarettes are becoming increasingly popular consumer devices. Some electronic cigarettes are provided with a liquid reservoir that stores vaporisable liquid. A flow path is provided from the liquid reservoir to a vaporiser, which is sometimes referred to as an atomiser. Often an atomiser is provided with a wick or absorber that can absorb liquid from the reservoir and a heating coil that can vaporise the liquid that is received in the absorber. These heating coils are often provided as electrically resistive wires that are wrapped around the absorber.

Another technique for vaporising liquid involves the use of lasers. One technique for this is described in WO 2017/182554. In this arrangement a laser emitter projects light into a light guide that couples light towards a target. The target in this example includes a number of absorbers that extend into a liquid reservoir.

A problem can arise in electronic cigarettes if the target that absorbs radiation from the laser becomes dry. In these circumstances the temperature of a dry absorber can be increased beyond the normal operating range of between 200-400° C., and this can cause the production of undesired volatile compounds. This problem is sometimes referred to as dry-absorber or "burning absorber".

BRIEF SUMMARY OF THE INVENTION

An object of the present invention is to address and overcome this issue.

According to an aspect of the invention there is provided an electronic cigarette comprising: a vaporising light source; a reservoir for storing a vaporisable liquid; a first absorber configured to generate heat by absorbing light from the vaporising light source; and an optical interface provided between the first absorber and the vaporising light source, wherein a flow path is provided for vaporisable liquid to flow from the reservoir towards the optical interface and the first absorber; wherein the optical interface selectively reflects or refracts light emitted by the vaporising light source such that light emitted by the vaporising light source is coupled towards the first absorber when liquid is present at the optical interface and light emitted by the vaporising light source is coupled away from the first absorber when liquid is not present at the optical interface.

In this way, the vaporising light source can be used for vaporisation only when the vaporisable liquid is present at the optical interface. By configuring the flow path of liquid from the reservoir towards the first absorber such that vaporising light is only received at the optical interface when liquid is also present in the optical interface, it is possible to prevent the vaporising light source from heating a dry absorber and generating undesirable vapours because light is coupled away from the first absorber in these circumstances. On the other hand, light from the vaporising light source is coupled towards the first absorber when liquid is present at the optical interface, which can promote production of vapour in the electronic cigarette. The flow path may be configured such that liquid is generally conveyed by a suitable liquid conveying mechanism from the reservoir towards the optical interface via the first light absorber. An alternative is where the liquid is conveyed from the liquid reservoir towards the first absorber via the optical interface. The conveying mechanism may for example be a capillary wick.

The first absorber is a radiation absorber that is arranged to absorb light from the vaporising light source. In some embodiments the first absorber may also be arranged to absorb liquid from the reservoir, or the optical absorber may be integrated and distributed within a liquid absorber such as a capillary wick. A liquid absorber (e.g. a capillary wick made for example from fibrous material such as cotton, glass fibre and/or Kevlar, or made from a non-fibrous porous material such as a porous ceramic material for example) is not required in all embodiments, provided that liquid from the reservoir can be provided in close proximity to the radiation absorber.

Preferably light emitted by the vaporising light source is transmitted towards the first absorber when liquid is present at the optical interface and light emitted by the vaporising light source is reflected away from the first absorber when liquid is not present at the optical interface. Light may be transmitted towards the first absorber by refraction at the optical interface.

Preferably the electronic cigarette includes a light guide configured to receive light emitted by the vaporising light source, and the optical interface is preferably provided between the first absorber and the light guide. The vaporising light source can therefore be provided some distance away from the first absorber. The light guide can couple light from the vaporising light source towards the first absorber.

The light guide may be a solid prism (by which we mean an optically transparent solid, elongate structure of substantially uniform cross section along at least the majority of its length—e.g. a rod), and light may propagate internally within the prism. The light guide may be made of glass or some other transparent material. The light guide may include reflecting surfaces that are internal to the solid prism. Alternatively, the light guide may include reflecting surfaces so that light from the vaporising light source can propagate in free air (or a (partial) vacuum) between the reflecting surfaces, at least in part.

The optical interface is preferably provided on a surface of the light guide. The optical interface may be a solid-air or solid-liquid interface at an external surface of the light guide, depending on whether liquid is present at the interface. The reflectivity of the optical interface may depend on the refractive indices of the light guide, the vaporisable liquid, air and the angle of incidence. Values for these parameters are chosen so that light is reflected when there is a solid-air interface and so that light is transmitted or refracted towards the first absorber when there is a solid-liquid interface.

The vaporising light source is preferably oriented so that its emitted light forms an angle of incidence on the surface of the light guide that acts as the optical interface, and the angle of incidence is preferably higher than a critical angle for total internal reflection when liquid is not present at the optical interface.

Totally internally reflected light from the optical interface is preferably directed towards a second surface of the light guide, and the angle of incidence at the second surface is preferably lower than a critical angle for total internal reflection so that light is refracted at the second surface, and transmitted away from the light guide.

The angle may be lower than the critical angle for total internal reflection when liquid is present at the optical interface. In this way, the conditions for total internal reflection are dependent on the presence of liquid at the optical interface. Light can be refracted and transmitted towards the first absorber when liquid is present so that the liquid can be effectively vaporised, whereas light can be reflected away from the first absorber when liquid is absent to prevent a dry absorber from burning.

In one arrangement the light guide may have a main axis that is provided at an angle to a longitudinal axis of the electronic cigarette. Preferably the end face of the light guide is provided with a normal vector that is parallel to the longitudinal axis of the electronic cigarette. In other words, the end face of the light guide preferably forms a plane that is perpendicular to the longitudinal axis of the electronic cigarette. This means that the light guide is preferably asymmetric within the rod-shaped electronic cigarette and this asymmetry is provided to create the conditions for total internal reflection at the end face when the absorber is dry and there is no liquid at the optical interface.

A gap may be provided between the light guide and the first absorber, and the flow path may allow vaporisable liquid to flow into the gap. The vaporisable liquid may flow into the gap by gravity or by capillary effects. Additionally, or alternatively, a pump may be provided to promote the flow of liquid into the gap.

The electronic cigarette may include a second absorber for receiving light reflected away from the absorber at the optical interface. The second absorber can act as a light dump to effectively absorb the light without producing undesirable vapours or products. The second absorber may be connected to a heat sink to enable effective absorption.

A sensor may be provided for detecting the presence of light coupled away from the optical interface and for controlling light emitted by the vaporising light source. In this way, the sensor can detect if light is being coupled away from the optical interface due to an absence of liquid. This can be used to prevent light being emitted by the vaporising light source or to interrupt the supply of power to the vaporising light source. The sensor may be an optical sensor. Alternatively a thermal sensor may be provided in the second absorber.

An airflow channel may be provided between an air inlet and a mouthpiece, and the first absorber may be provided in or adjacent the airflow channel so that vaporised liquid can be inhaled by a user. The vaporising light source is preferably provided in or adjacent the airflow channel at a position between the absorber and the air inlet so that the airflow can be heated by the vaporising light source. In this way the airflow can be pre-heated before it enters a vaporisation chamber. This can advantageously reduce the amount of energy required to vaporise the liquid. This can lead to a faster and more efficient vaporisation. Additionally, the airflow can cool the vaporising light source and can re-cycle waste heat so that less energy is required during vaporisation. This can usefully conserve battery resources in the electronic cigarette. The vaporising light source may be connected to a heat sink, and either the vaporising light source or the heat sink may be provided in or adjacent the air flow.

Preferably the vaporising light source is a laser. A laser can provide a light beam with a specific wavelength that is well suited to vaporising a liquid. In another arrangement it may be possible for the vaporising light source to be an LED. Advantages of using an LED in place of a laser are that they tend to be less expensive and less likely to cause any injury if a user is inadvertently exposed to light emitted by an LED. The disadvantage is that it is harder to provide a densely collimated beam and so it is more difficult to provide high energy densities at the first absorber, which may mean that higher energy needs to be provided to the LED for a similar vaporization effect, reducing the energy efficiency of the device as a whole compared to the case where a laser is used as the light source.

According to another aspect of the invention there is provided a method of operating an electronic cigarette comprising the steps of: storing a vaporisable liquid in a reservoir; providing a vaporising light source and an optical interface between the vaporising light source and a first absorber, and providing a flow path for liquid in the reservoir towards the first absorber and the optical interface; emitting light from the vaporising light source towards the optical interface; and selectively reflecting or transmitting light emitted by the vaporising light source at the optical interface so that light emitted by the vaporising light source is coupled towards the first absorber when liquid is present at the optical interface and light emitted by the vaporising light source is coupled away from the first absorber when liquid is not present at the optical interface, wherein the first absorber generates heat by absorbing light from the vaporising light source.

According to a further aspect of the invention, there is provided a component for an electronic cigarette comprising: a housing having a bottom portion configured for engagement with an electronic cigarette device, a reservoir for storing a vaporisable liquid, a fluid-permeable absorber arranged in fluid connection with the reservoir; and a through-channel extending from an opening in the housing to a vapor outlet, wherein the absorber is located in the through-channel so that air flows through or past the absorber from the opening in the housing to the vapor outlet.

In an embodiment, the absorber is provided with extending projections which extend into the inlets of the liquid reservoir. The cross-sectional area of the protruding portion can be smaller than the cross-sectional area of the through-channel.

In an embodiment, the housing may be provided with an annular flange, such that the bottom portion of the capsule is placed at a distance from an interior surface in the electronic cigarette. This creates a space for receiving the airflow around the bottom portion of the absorber.

BRIEF DESCRIPTION OF THE DRAWINGS

Embodiments of the invention are now described, by way of example, with reference to the drawings, in which.

DETAILED DESCRIPTION

As used herein, the term "inhaler" or "electronic cigarette" may include an electronic cigarette configured to deliver an aerosol to a user, including an aerosol for smoking. An aerosol for smoking may refer to an aerosol with particle sizes of 0.5-7 microns. The particle size may be less than 10 or 7 microns. The electronic cigarette may be portable.

Figure 1:
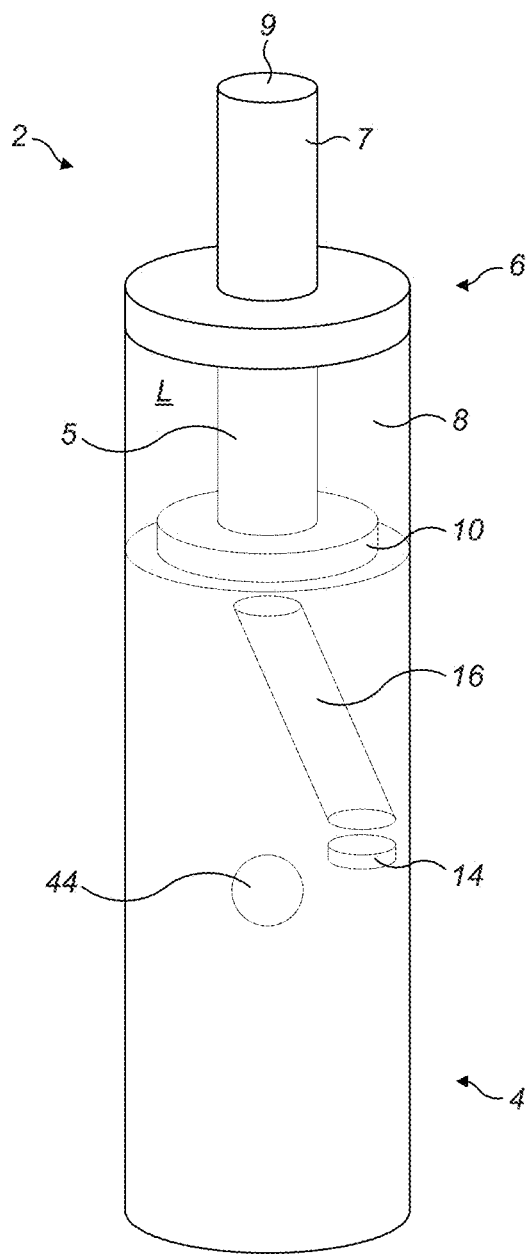
FIG. 1 is a schematic view of an electronic cigarette in an embodiment of the invention.

FIG. 1 shows a schematic view of an electronic cigarette 2 in an embodiment of the invention. The electronic cigarette 2 can be used as a substitute for a conventional cigarette comprising shredded tobacco. The electronic cigarette 2 may have an elongate main body that includes a power supply or battery portion 4, and a mouthpiece portion 6 comprising a reservoir 8 for storing vaporisable liquid L. The vaporisable liquid may be as propylene glycol or glycerin, which is able to produce a visible vapor. The vaporisable liquid L may further comprise other substances such as nicotine and flavorings. The mouthpiece portion 6 is provided with a mouthpiece 7 with a vapor channel 5 and a vapour outlet 9. The mouthpiece 7 may have a tip-shaped form to correspond to the ergonomics of the user's mouth. The electronic cigarette additionally includes an air inlet 44 in fluid communication with the vapour outlet 9, whereby a user drawing on the outlet 9 causes air to flow into the device via air inlet 44 and through a vaporisation chamber 11 to the outlet 9. The reservoir can be configured as a refillable "open tank" reservoir or a removable cartridge or consumable.

Figure 3:
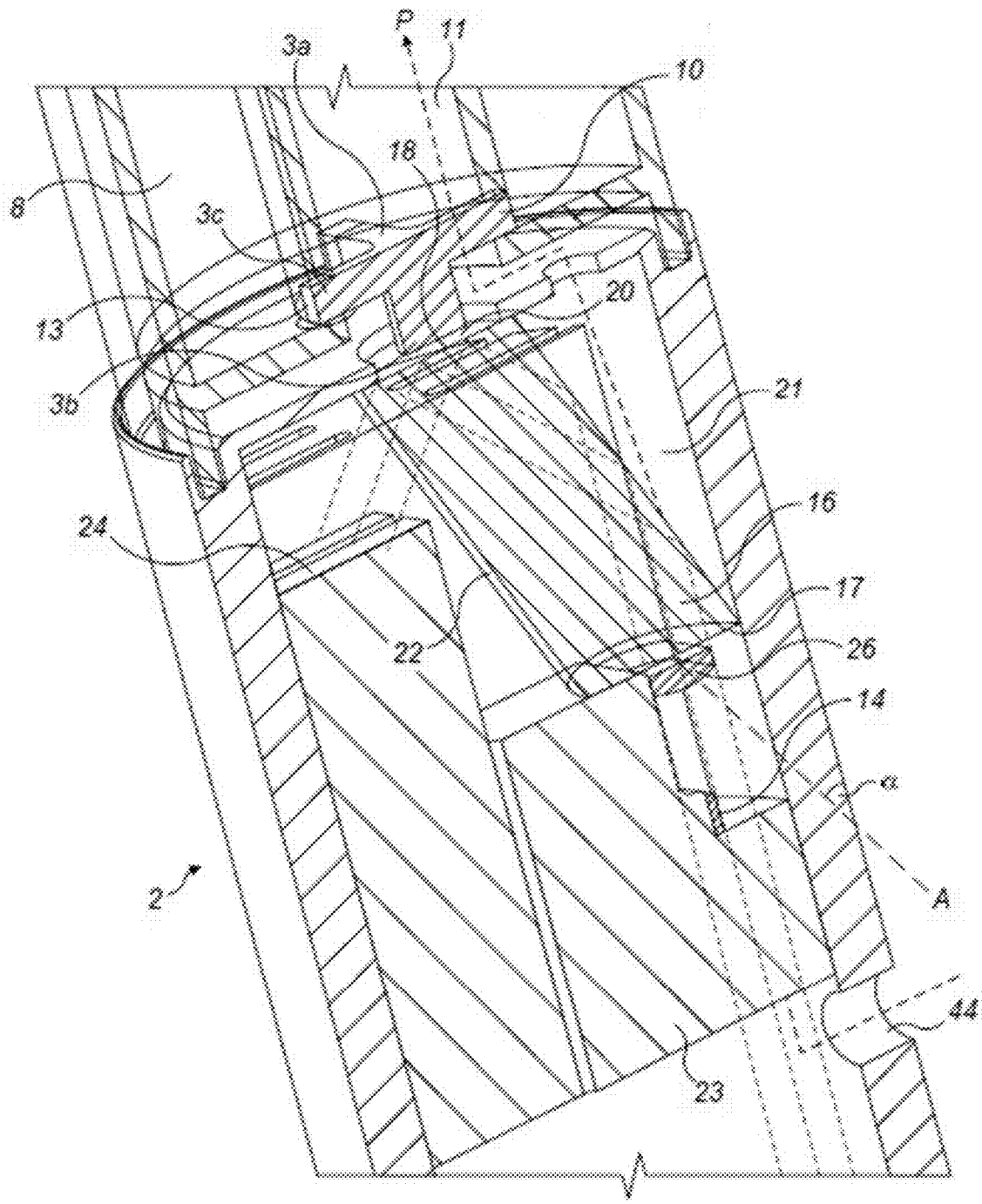
FIG. 3 is a cross-sectional view of an electronic cigarette in an embodiment of the invention.
Figure 4:
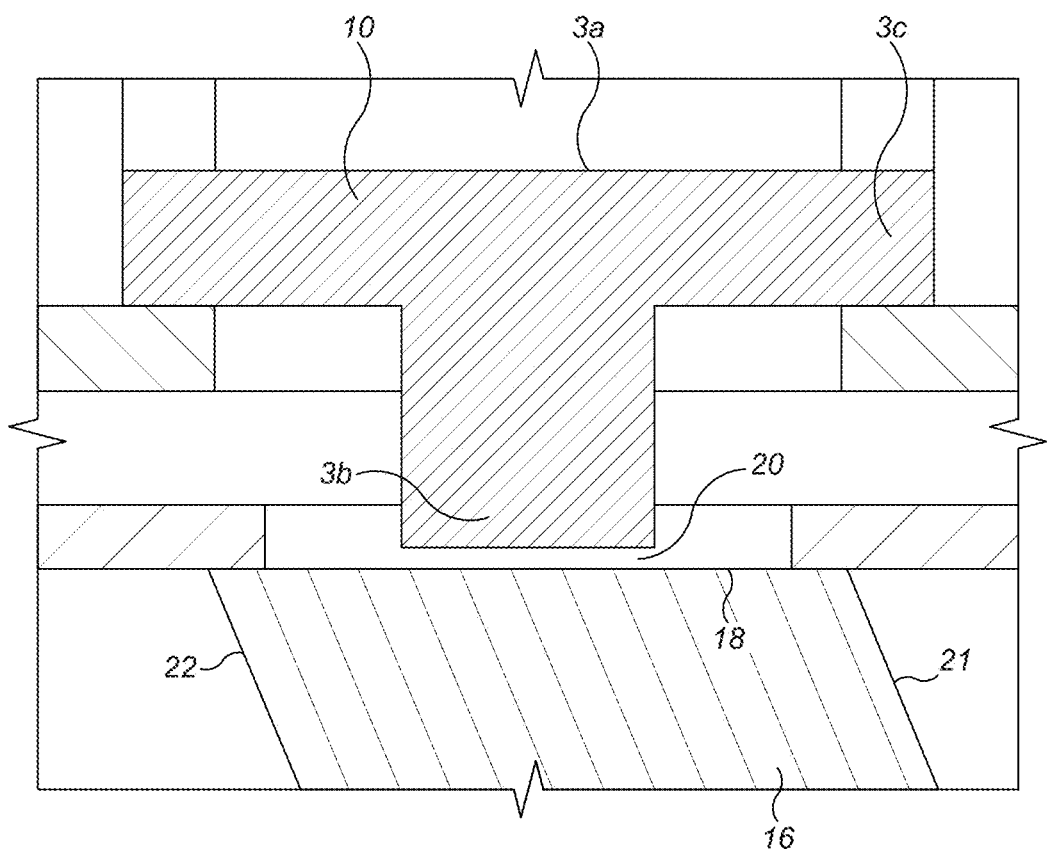
FIG. 4 is a cross-sectional view showing details of electronic cigarette of FIG. 3.

As best seen in FIG. 3, the electronic cigarette 2 comprises a vaporizing system including a light source 14, a light guide 16 and an absorber 10. The light source 14 is located in the battery portion 4 of the electronic cigarette and is configured to heat the absorber 10 by radiation. The absorber 10 is located in the vaporization chamber 11 and is fluidically connected to the liquid reservoir through at least one liquid outlet 13. The liquid outlet 13 provides a flow channel between the reservoir 8 and the absorber 10 so that vaporisable liquid L can flow towards the absorber 10 by capillary effects. Gravity may also be used to encourage the flow of vaporisable liquid L towards the absorber 10 and/or a pump (not shown) may be present.

The liquid reservoir 8 comprises the vapor channel 5, wherein a first proximal end is an open end configured as a vapor outlet 9. The absorber 10 is located at the second, distal end of the vapor channel which is in fluid communication with the air inlet 44 to provide a through path between air inlet 44 and outlet 9. The absorber 10 is at least partially contained within the vapour channel 5. The vaporisation chamber 11 is located in the proximity of the absorber 10. Typically the vaporization chamber 11 is defined as the region within the vapor channel 5 above the portion of the absorber 10 in which the heating temperature of the absorber 10 exceeds the temperature at which vaporization occurs when energized by light from the light source 14, into which vapour is formed as a result of this vaporisation. The typical vaporization temperature is 150 degrees Celsius to 350 degrees Celsius. The absorber 10 can perform two independent functions in this arrangement. First, the absorber 10 can absorb or retain the liquid L from the reservoir 8. Second, the absorber 10 can absorb radiation emitted by the laser 14 so that the material of the absorber 10 is heated. Heat can be transferred from the absorber 10 to the vaporisable liquid L so that it is vaporised.

A number of materials may be chosen for use in the absorber 10. In general the material of the absorber 10 is chosen as a radiation absorber for laser light. The laser light can be absorbed by the laser light in the absorber 10 and this can cause heating which vaporises the vaporisable liquid. The vaporisable liquid is generally optically transparent. In one example the absorber 10 may be provided as a porous metal. The absorber 10 could be formed of other light absorbing porous materials such as cotton with an integrated absorber, a metal wire mesh, porous ceramic with an integrated absorber or Kevlar fibres. Air holes can be integrated into the absorber in order to promote air flow when the absorber 10 is saturated with liquid. An absorber 10 such as a metal mesh may be provided with light absorption properties, but without or with limited liquid absorption properties, in which case a separate mechanism (e.g. a separate wick) is preferably used to ensure that liquid is present in the vicinity of the absorber 10 to enable efficient heating and hence vaporization of the liquid aerosol forming substrate (i.e. the vapourisable liquid).

The electronic cigarette 2 further includes a light source 14 in the form of a laser 14 and a light guide 16. A laser diode may advantageously be provided as the laser 14 as it can provide high optical energy within a compact size. Typical wavelengths for the emitted light range from 785 nm to 1064 nm. Multimode lasers are preferred because they can provide a higher power output and are typically available at a lower cost. However, single mode lasers could also be used.

The laser 14 is electrically powered by the battery source 4 and is positioned to emit light towards the light guide 16. The light guide is positioned between the light source 14 and the absorber 10 and is configured to propagate the light within the transparent light guide 16 towards the absorber 10. The light guide has a first end face 17 and a second end face 18. The first end face 17 is operationally coupled to the light source and the second end face 18 is operatively coupled to the absorber 10.

The light guide 16 is made of an optically transparent material such as glass or polycarbonate, which have a refractive index of around 1.5 and 1.581 respectively. In the embodiment illustrated in FIG. 3, the light guide 16 has a main axis A that is provided at an angle α in relation to the longitudinal axis of the electronic cigarette 2. The light guide 16 is therefore provided asymmetrically within the electronic cigarette 2. The laser 14 couples light into the light guide 16 so that the light propagates within the light guide 16.

Figure 12:
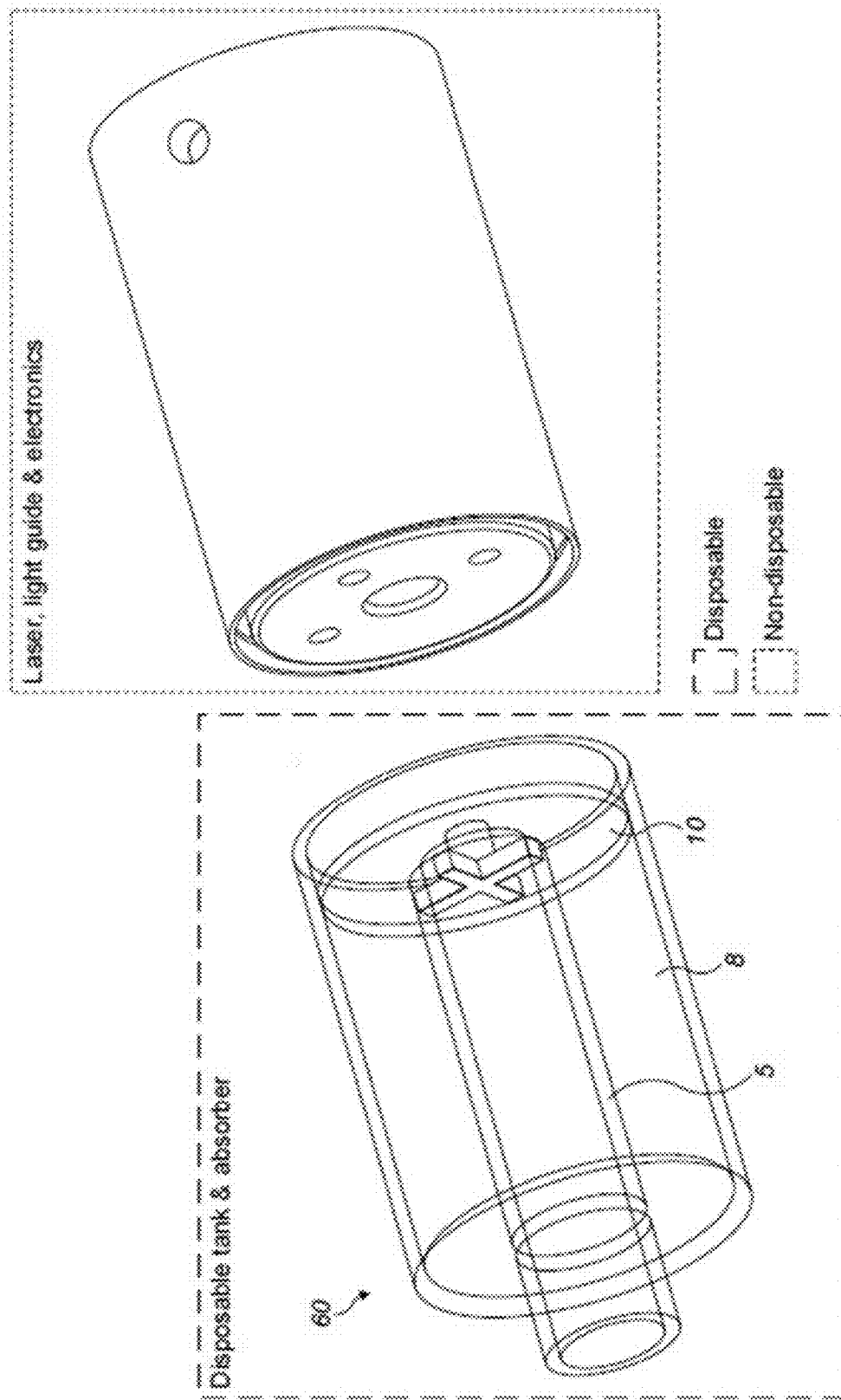
FIG. 12 is a schematic view of a disposable cartridge according to an embodiment of the present invention.

The liquid reservoir can be configured as a refillable reservoir. However, as illustrated in FIG. 12, the reservoir 8 can be included in a removable cartridge 60 or consumable. The cartridge 60 comprises the liquid store 8, the vapor channel 5 and the absorber 10. The liquid outlets 13 are arranged in the bottom portion of the cartridge. Preferably, the liquid openings are in contact with the absorber, such that the liquid is forced to flow through the absorber 10. The absorber 10 is located within the vapor channel 5. The vapor channel 5 is configured as a through-channel extending from an opening 44 in the housing under the absorber 10 to the vapor outlet 9.

The absorber 10 is arranged in fluid connection with the reservoir 8. The absorber is provided with a first surface 3a located in the vapor channel 5 and a second surface provided as a coupling surface 3b the light guide 16. The absorber 10 may also be provided with extending projections 3c which extend into the liquid outlets 13 of the liquid reservoir 8. The absorber 10 enables the vaporisable liquid L to flow from the reservoir 8 and deposit on the coupling surface 3b.

A user can draw air into the device through the air inlet 44 by inhaling on the mouthpiece 7. The airflow path P may advantageously pass in the proximity of the laser 14 and towards the vaporisation chamber 12. In this way, the laser 14 can pre-heat the airflow before it reaches the absorber 10.

Figure 2A:
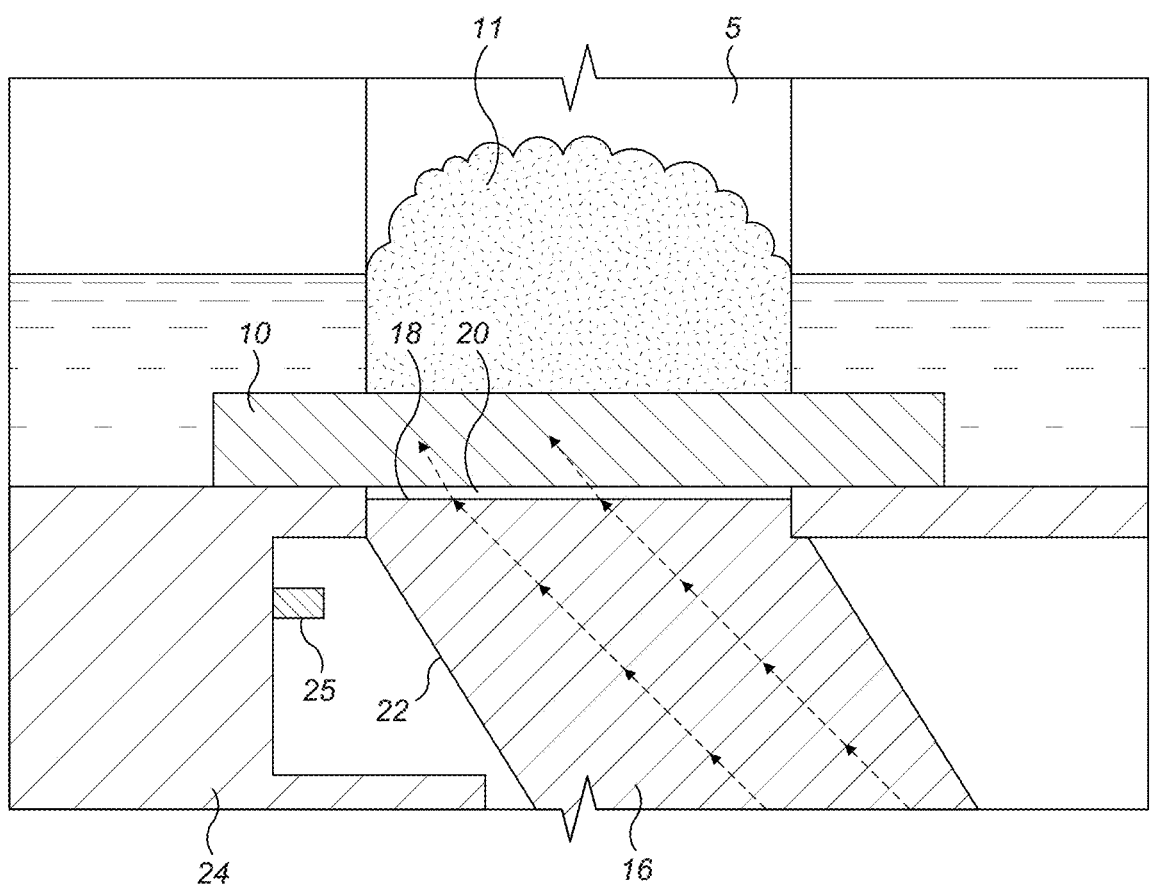
FIGS. 2a and 2b are schematic cross-sectional views illustrating the vaporisation chamber in an embodiment of the invention.
Figure 2B:
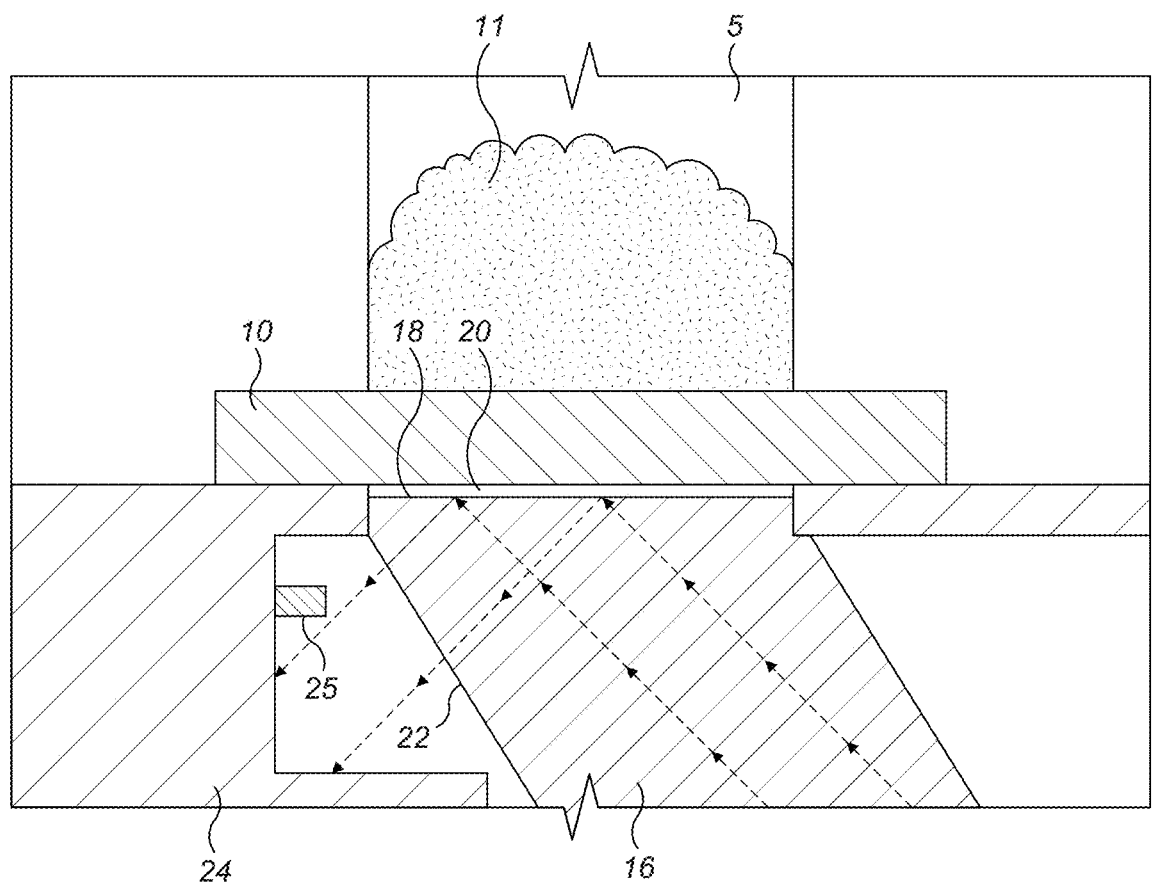

FIGS. 2a and 2b illustrate the working principle of the light guide 16 and the absorber 10. In these illustrative drawings, FIG. 2a illustrates the liquid store filled with liquid in it, whereas FIG. 2b illustrates the liquid store when it is empty. Thus, FIG. 2a illustrates the situation when liquid is present in the absorber 10, whereas FIG. 2b illustrates the situation when liquid is absent.

The absorber 10 is provided above the second end face 18 of the light guide 16, and a gap 20 is provided between the second end face 18 of the light guide 16 and the absorber 10. When the absorber 10 is dry the gap 20 is generally filled with air. In these circumstances there is a sold-air optical interface at the second end face 18 of the light guide 16 which is encountered by light propagating within the light guide 16. When the absorber 10 is wet the liquid in the absorber 10 can flow towards the gap and can settle on the second end face 18 of the light guide 16. In these circumstances there is a solid-liquid optical interface at the second end face 18 of the light guide 16 which is encountered by light propagating within the light guide 16.

The reflectivity of the second end face 18 is determined according to Snell's Law. In particular, the critical angle for total internal reflection, $\theta_c$ is determined by: $\theta_c = \arcsin(n_2/n_1)$, where $n_1$ is the refractive index of the light guide 16 and $n_2$ is the refractive index of the medium in the gap 20: which is air or liquid, depending on whether the absorber 10 is wet. The geometry of the laser 14, the light guide 16 and the absorber 10 is fixed. Therefore, the angle of incidence, $\theta$, remains the same for light propagating within the light guide 16 towards the second end face 18. The critical angle $\theta_c$ is different, however, when liquid is present and absent. This means that light is refracted and transmitted towards the absorber 10 when liquid is present. Conversely, light is totally internally reflected at the second end face 18 when liquid is absent. This can prevent the laser 14 from heating a dry absorber 10 and creating undesirable compounds.

Light that is reflected from the second end face 18 is incident on a side face 22 of the light guide 16. A solid air interface is provided by the gap 20 at the side face 22, and the angle of incidence for light propagating from the second end face 18 is lower than the critical angle, $\theta_c$. Therefore, light is refracted at the side face 22 and is transmitted towards a beam dump 24. The beam dump 24 is a radiation absorber that can absorb laser light without the creation of any undesirable volatiles.

The beam dump 24 can include a sensor 25 such as a heat sensor or an optical sensor. The sensor can directly or indirectly detect the presence of laser light received at the beam dump 24 and can provide electrical feedback signals to the laser 14. In this way, the laser 14 can be switched off when light is received at the beam dump 24. This can minimise waste of energy caused by operation of the laser 14 that does not result in vaporisation of the vaporisable liquid L.

The refractive index of the light guide 16 is preferably that of glass or similar to that of glass, in which case $n_1 \sim 1.5$, depending on the specific material. In one arrangement the light guide 16 may be a transparent plastic, which would have a refractive index in a similar range. The refractive index of the vaporisable liquid is also around 1.5, depending on the compounds that are used. A refractive index of n=1.44 is provided for propylene glycol and n=1.47 for glycerol. If a mixture of these compounds is used then the refractive index of the vaporisable liquid may be between 1.44 and 1.47. The refractive index of empty space is 1, and the refractive index or air is slightly higher than this at room temperature and pressure.

The light guide 16 is configured such that the light emitted from the light source 14 is refracted inside the light guide 16 and reaches the absorber 10 at the desired angle of incidence. FIGS. 3 to 8 illustrate different embodiments of the light source 14 and the light guide 16 that achieve the desirable angle of incidence.

In the embodiment of FIG. 3, the laser 14 is provided in an off-set position in relation to the longitudinal axis A of the electronic cigarette 2. The laser 14 emits light in a direction that is parallel to the rotational axis of the electronic cigarette 2. The preferred light source 14 is a laser diode, and these can exhibit a significant beam divergence at the exit face of the lasing element. A typical divergence is 25° along the fast axis and 8° along the slow axis. The difference in these angular divergence values results in an elliptical beam profile. A lens 26 is provided between the laser 14 and the light guide 16 in order to collect and collimate the output light beam from the laser 14. In an alternative the lens 26 may be integrated with the light guide 16 or cemented to the light guide 16. In this example the lens 26 collimates the light only along the fast axis of the laser 14, since this undergoes a larger beam divergence.

The light guide 16 in the embodiment has a rhombus or parallelogram shaped longitudinal cross-section such that it has a first end face 17 coupled to the light source 14 and a second end face coupled to the absorber 10. Hence the light guide 16 is configured to bridge the light from the light source 14 to the proximity of the absorber 10. The laser light is received at the base of the light guide 16 and undergoes total internal reflection from a first surface 21 of the light guide 16. The light then propagates towards the second end face 18 where it is either reflected or refracted, depending on whether vaporisable liquid is present in the gap 20. Reflected light propagates within the light guide 16 towards a second surface 22. The angle of incidence at the second surface 22 is higher than the critical angle $\theta_c$ at this glass:air interface. Therefore the light is refracted from the light guide 16 and it propagates in free air towards the beam dump 24. The first and second surfaces 21, 22 of the light guide 16 are planar. In this embodiment the light guide 16 is a prism with a parallelepiped shape.

Figure 5:
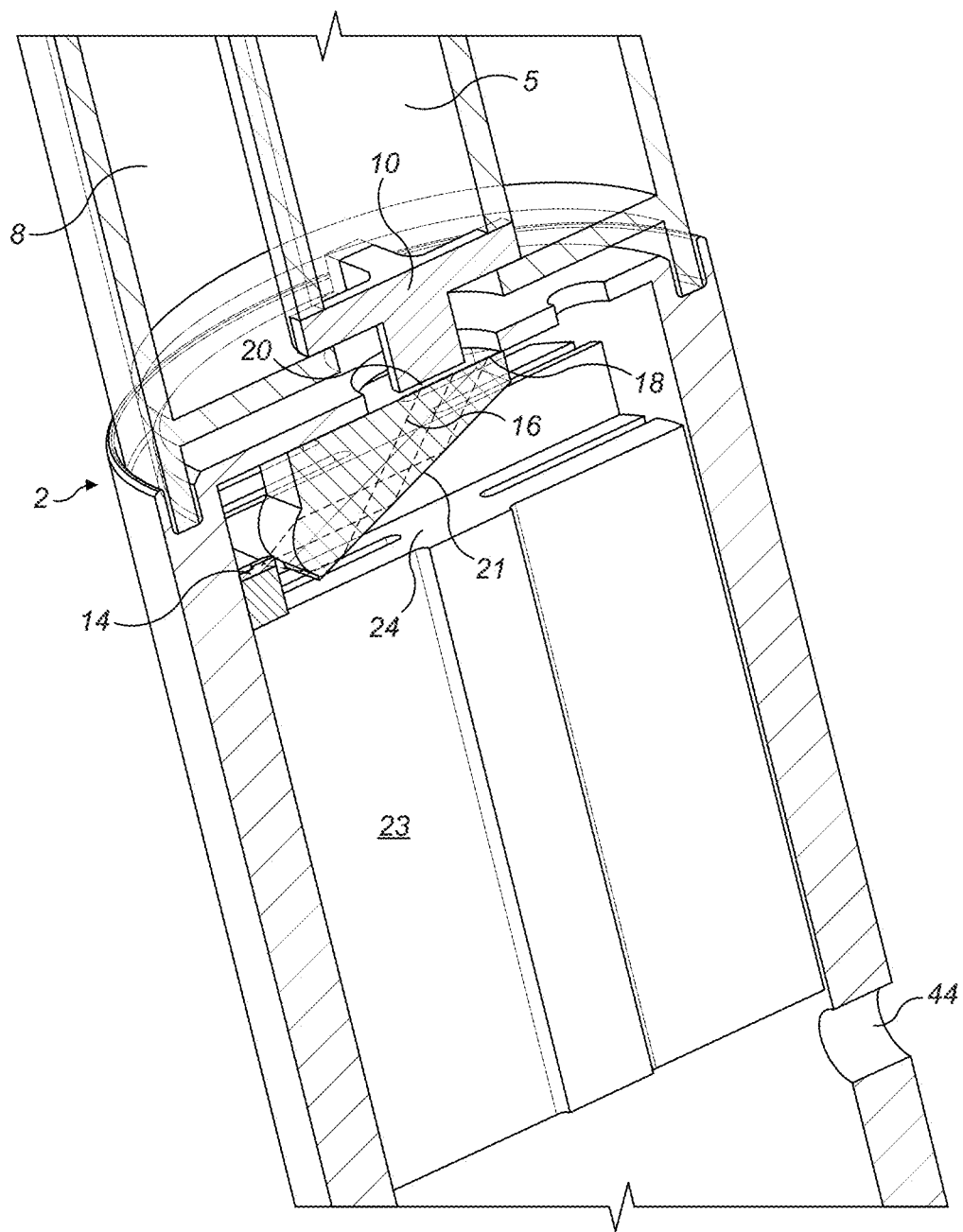
FIG. 5 is a cross-sectional view of an electronic cigarette in another embodiment of the invention.

FIG. 5 is illustrates another possible shape of a light guide 16. As previously stated, the function of the light guide 16 is to refract and convey light at an angle of incidence to the absorber 10. In the embodiment of FIG. 5, the light guide 16 has a composed geometrical shape. In this example the laser 14 is oriented so that it emits light in a direction that is perpendicular to the longitudinal axis of the electronic cigarette 2. The geometrical shape of the light guide 16 is configured to re-direct the perpendicular light beam to arrive at the absorber 10 at a desired angle of incidence. The light guide 16 has a generally triangular shape in order to couple light towards the absorber 10. In this example there is no separate collecting lens but a surface 28 of the light guide 16 facing the laser 14 is curved in order to act as a cylinder lens and provide an optical power along the fast axis of the laser 14. Light received from the laser 14 is coupled into the light guide and 16 is totally internally reflected at a first surface 21. The totally internally reflected light then propagates within the light guide 16 towards the second end face 18. When liquid is present in the gap 20, light is refracted at the second end face 18 so that it propagates towards the absorber 10. Reflected light propagates within the light guide 16 towards the first surface 21. When liquid is absent in the gap 20, light is reflected at the second end face 18. This reflected light is received at the first surface 21 at a different angle of incidence so that it is refracted and exits the light guide towards the beam dump 24.

Figure 6:
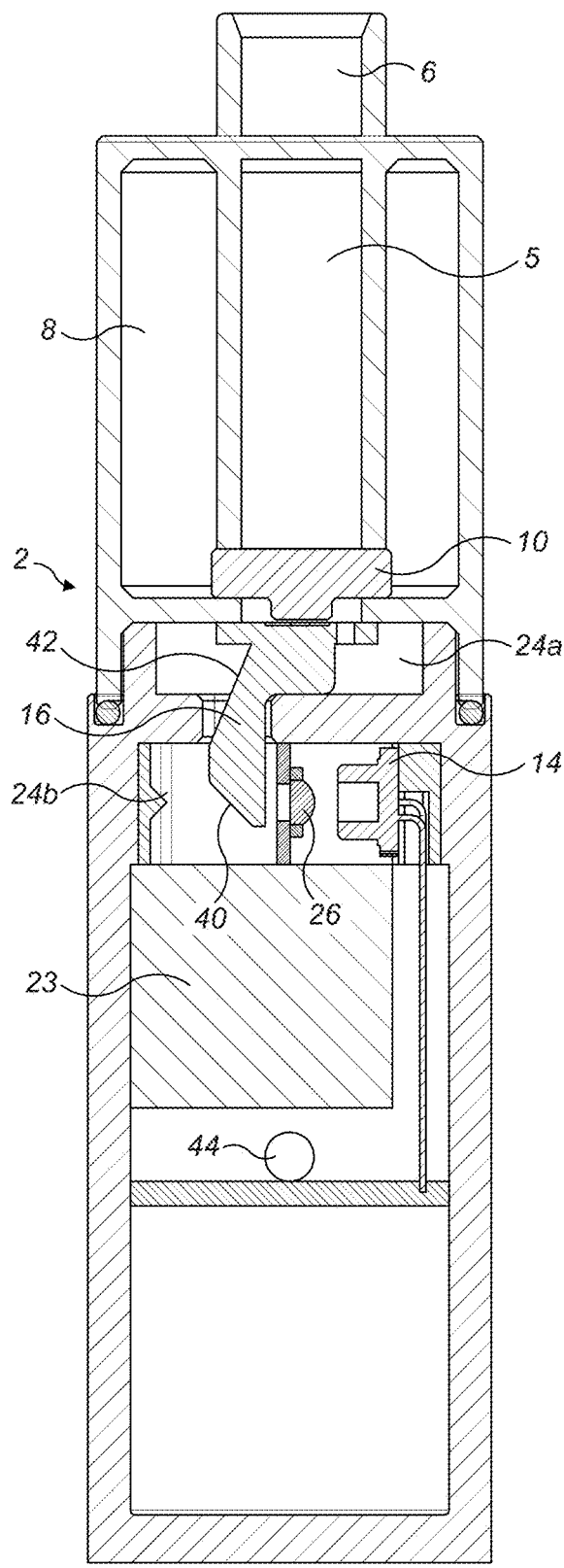
FIG. 6 is a cross-sectional view of an electronic cigarette in another embodiment of the invention.
Figure 7:
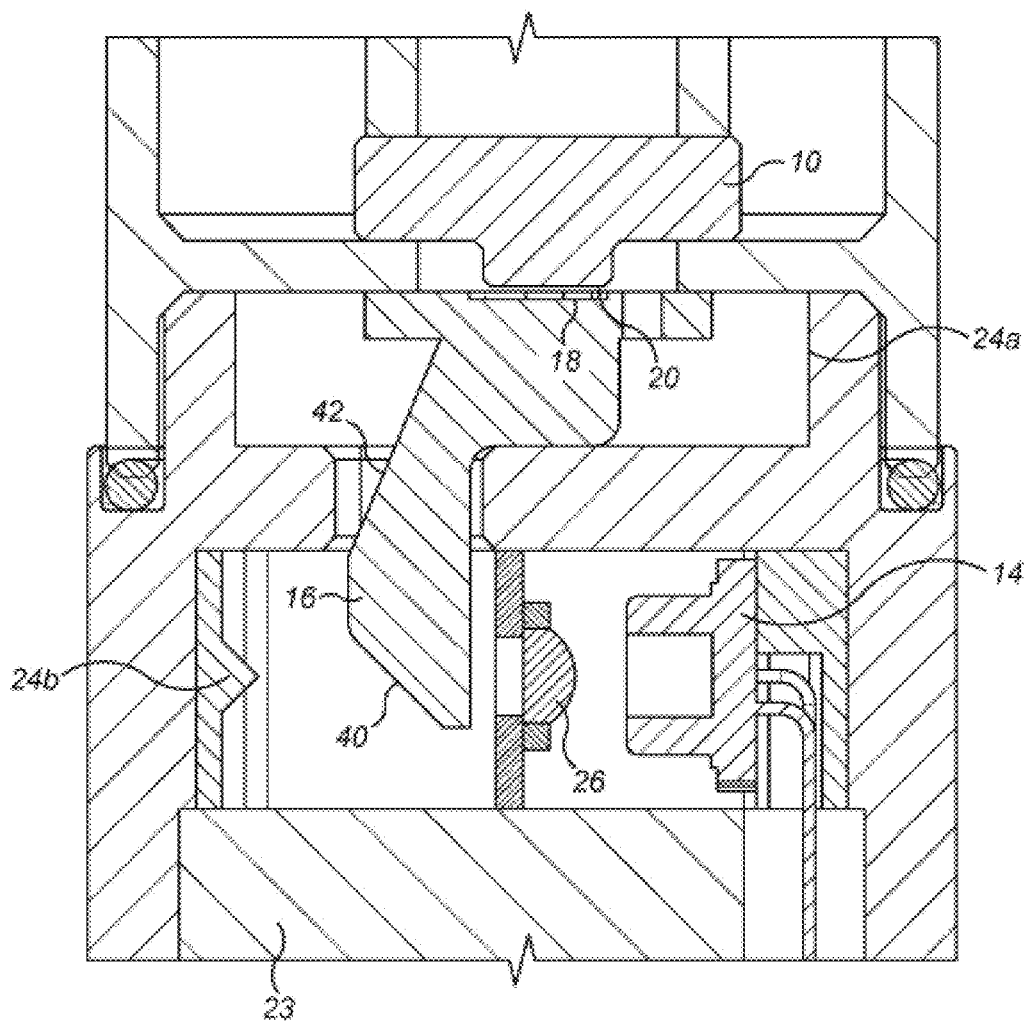
FIG. 7 is a cross-sectional view showing details of electronic cigarette of FIG. 6.
Figure 8:
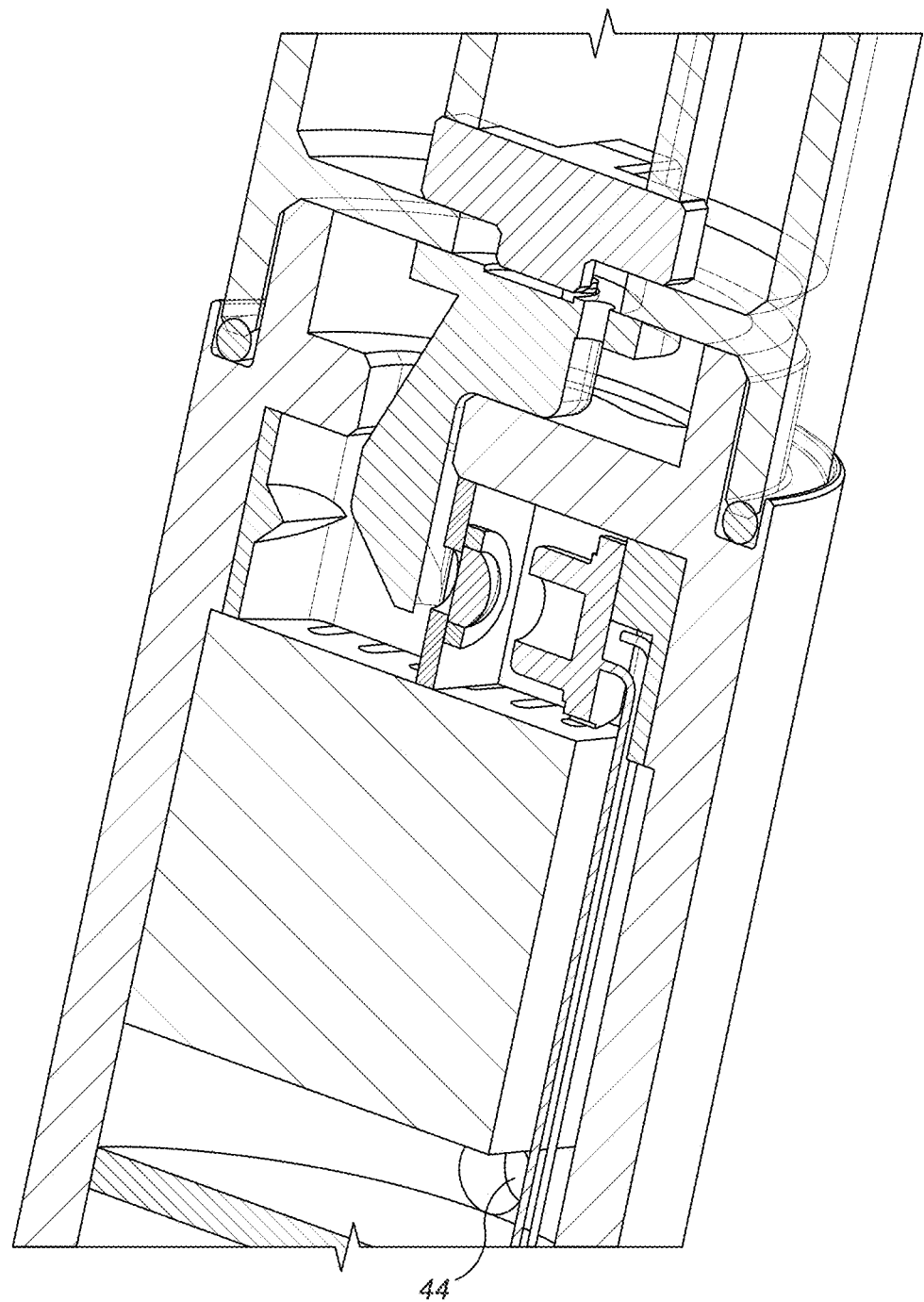
FIG. 8 is a perspective cross-sectional view showing details of electronic cigarette of FIG. 6.

FIGS. 6 to 8 show cross-sectional views of an electronic cigarette 2 in another embodiment of the invention. In this example the laser 14 is also oriented in a direction that is perpendicular to the rotational axis of the electronic cigarette 2. The light guide 16 has a shape that allows it to couple light from the laser 14 towards the absorber 10. A lens 26 is provided to collimate the beam output from the laser 14. Light is totally internally reflected twice within the light guide 16 at a first surface 40 and a second surface 42 before it is received at the second end face 18. As illustrated in FIGS. 6-8, the lens can be separate from the light guide 16. Alternatively, the lens 26 can be integrated with the light guide 16 so as to form a single part. Light is reflected from the second end face 18 in the absence of liquid from the reservoir 8 so that it is refracted out of the light guide 16 and towards a first beam dump 24a. Light is refracted from the light guide 16 when liquid is present at the second end face 18 so that the light propagates towards the absorber 10 to vaporise liquid received therein.

A second beam dump 24b is provided at a position that would directly receive light from the laser 14 in the absence of the light guide 16. Thus, if the light guide 16 were to be removed any light emitted by the laser 14 would be safely absorbed by the second beam dump 24b.

The laser 14 is connected to a heat sink 23 in order to prevent it becoming too hot. In addition, air inlets 44 are provided for the vaporising air flow, and the air flow is directed past the laser 14 and/or the heat sink 23. In this way, air from the environment can be used to cool the laser 14. Additionally, the laser 14 can heat the air that is drawn into the device. This reduces the amount of energy that is required from the laser in order to vaporise the vaporisable liquid. This further reduces the energy required to operate the laser 14, which also reduces its heat output. The heat sink 23 is also connected to the beam dumps 24a, 24b. It has been found that an aluminium heat sink 23 can be provided with a mass of around 0.015 kg. In some embodiments a circular heat sink 23 can be provided with a 20 mm diameter, a height of 35 mm and a fill factor of around 50% (that is, around 50% of the volume of the heat sink is filled with air).

Figure 9A:
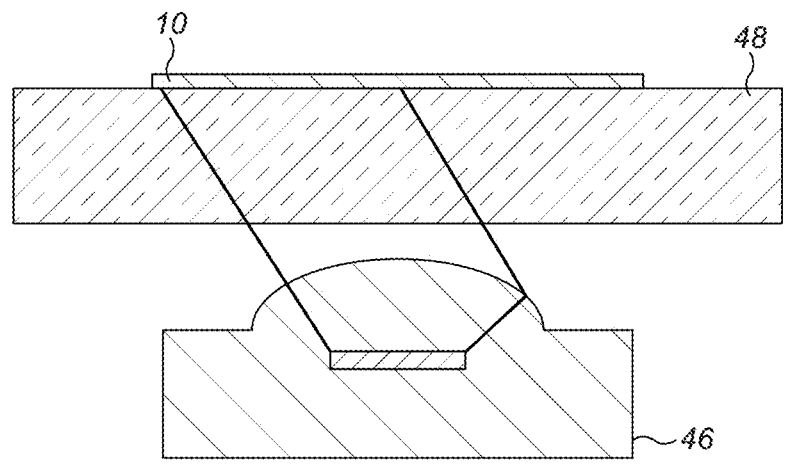
FIG. 9a is a schematic view of a heating system for an electronic cigarette using an LED.
Figure 9B:
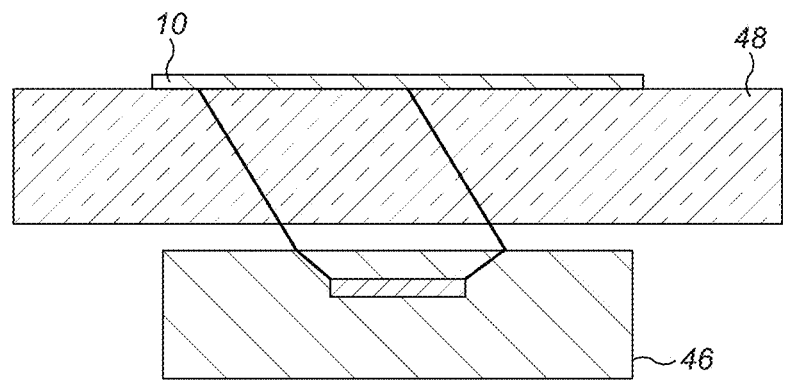
FIG. 9b is a schematic view of a heating system for an electronic cigarette using another type of LED.
Figure 10:
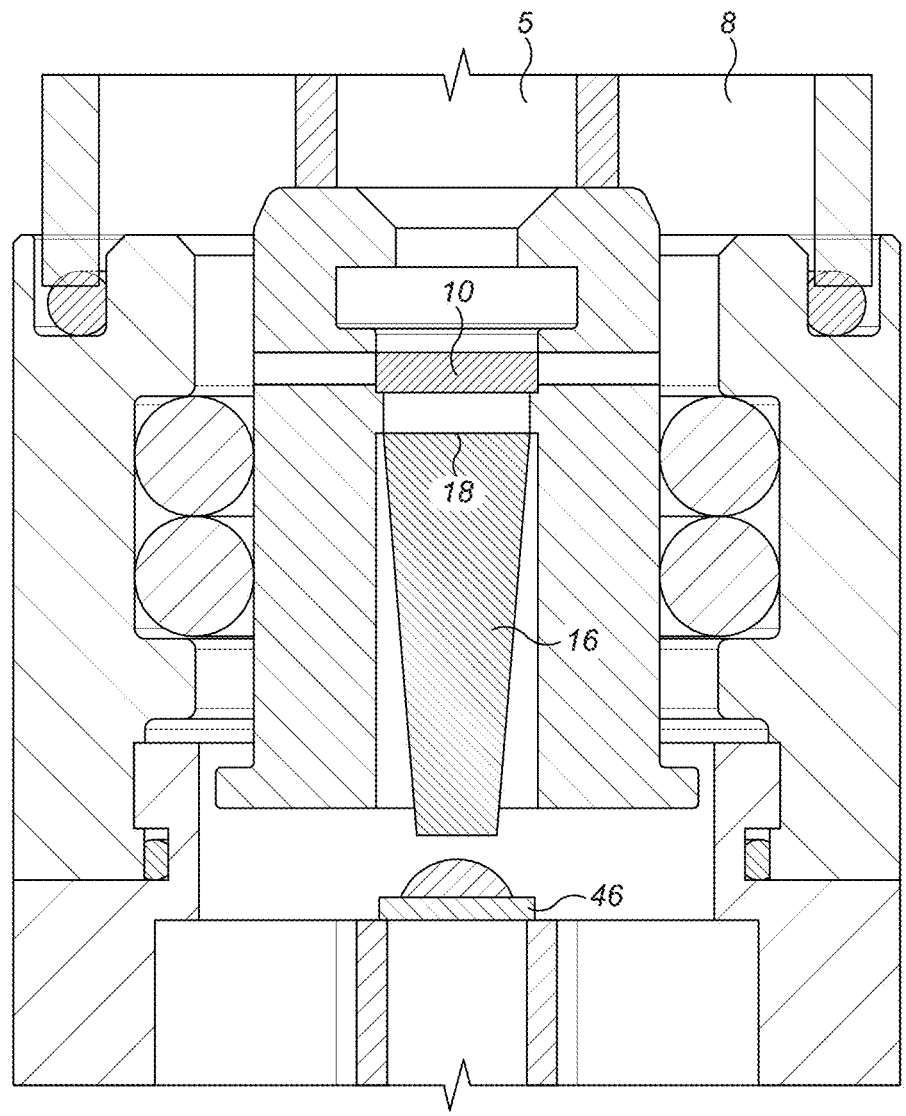
FIG. 10 is a cross-sectional view of an electronic cigarette showing a heating system that uses an LED.

FIGS. 9 to 10 illustrate further exemplary embodiments of the present invention wherein a light source in the form of a LED is used instead of a laser. High power LEDs are known at near infra-red (850 nm) and ultraviolet (405 nm). LEDs typically require the addition of optical components for beam shaping to deal with their wide emission angles in comparison to lasers. In one arrangement, as shown in FIG. 9a, a LED 46 with an integrated lens is placed in close proximity of the absorber 10. In order to protect the LED from soiling a protective window 48 is positioned between the LED package 46 and the absorber 10. FIG. 9b shows another possible arrangement where the LED 46 is provided without a lens. In these embodiments a gap (not shown) can be provided between the absorber 10 and the window 48, and a flow path can be provided for the vaporisable liquid to flow into the gap. The LED 46 can be provided in a position relative to the lens so that light subtends an angle at the optical interface between the window 48 and the gap. This can allow selective refraction or reflection, depending on whether liquid is present in the gap.

In the arrangement illustrated in FIG. 10, an LED 46 with an integrated lens is provided with a tapered light guide 46. This can effectively collect rays from the LED 46 with a steep angle. The entry of the waveguide 16 is slightly larger than the light emitting chip and the second end face 18 is matched to the size of the absorber 10. The waveguide can be coated with an absorptive coating at the second end face 18. The taper of the waveguide 16 has the effect that the acceptance angle is larger than for a straight waveguide. This is useful as the LED 46 has a large angular emission profile. For a constant entry and exit surface the length of the waveguide 16 has an effect of the taper angle, hence a very long waveguide is almost behaving like a straight waveguide, where a short waveguide can efficiently capture the rays with a large angle because of the large taper. As above, the LED 46 can be provided in a position so that light subtends an angle at the optical interface at the second end face 18. This can allow selective refraction or reflection, depending on whether liquid is present at the second end face 18. In the arrangement shown in FIG. 10 the waveguide 16 is provided an angle to the plane of the page. In this way, light emitted by the LED 46 is captured by the waveguide 16 and subtends an angle at the second end face 18 of the waveguide 16.

Figure 11A:
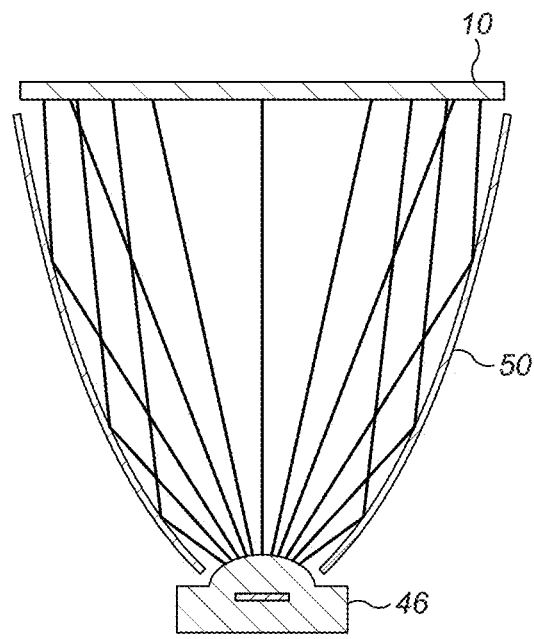
FIG. 11a is a schematic view of a heating system for an electronic cigarette using an LED.
Figure 11B:
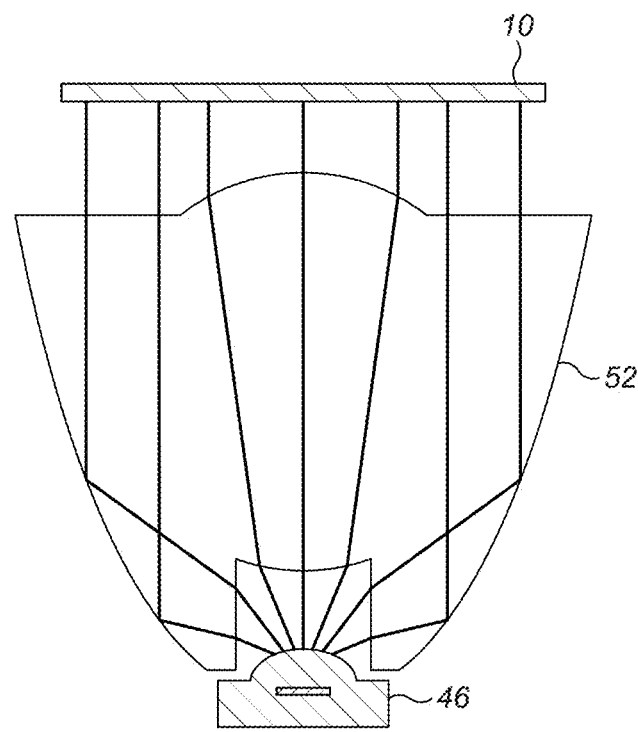
FIG. 11b is a schematic view of a heating system for an electronic cigarette using another type of LED.

In a further arrangement, as shown in FIGS. 11a and 11b, an LED 46 may be provided with a parabola reflector system which uses a parabolic surface to efficiently collect all the rays from the LED. Such a system can be realised with a reflector geometry, where the reflector is a mirror coated substrate 50 and light propagates in free air. As shown in FIG. 11B, the light guide 52 may be a total internal reflection light guide with a parabolic shape. These reflector geometries have a high collection efficiency. In the example of FIG. 11B the second end face 18 of the light guide 52 acts as an optical interface between the light guide 52 and the absorber 10. The LED 46 can be provided in a position so that light subtends an angle at the optical interface at the second end face 18. This can allow selective refraction or reflection, depending on whether liquid is present at the second end face 18. In the example of FIG. 11a a transparent object may be provided between the reflector 50 and the absorber 10 to provide selective reflection or refraction, depending on the presence of liquid.

The invention claimed is:

1. An electronic cigarette comprising:
   a vaporising light source;
   a reservoir for storing a vaporisable liquid;
   a first absorber configured to generate heat by absorbing light from the vaporising light source; and
   an optical interface provided between the first absorber and the vaporising light source, wherein a flow path is provided for vaporisable liquid to flow from the reservoir towards the optical interface and the first absorber;
   wherein the optical interface selectively reflects or refracts light emitted by the vaporising light source such that light emitted by the vaporising light source is coupled towards the first absorber when liquid is present at the optical interface and light emitted by the vaporising light source is coupled away from the first absorber when liquid is not present at the optical interface.

2. The electronic cigarette of claim 1, wherein light emitted by the vaporising light source is refracted towards the first absorber when liquid is present at the optical interface and light emitted by the vaporising light source is reflected away from the first absorber when liquid is not present at the optical interface.

3. The electronic cigarette of claim 1, further comprising a light guide that is provided between the vaporising light source and the first absorber, wherein the light guide is configured to receive light emitted by the vaporising light source and transfer the light to the optical interface which is provided between the first absorber and the light guide.

4. The electronic cigarette of claim 3, wherein the optical interface is provided on a surface of the light guide.

5. The electronic cigarette of claim 4, wherein the vaporising light source is oriented so that its emitted light forms an angle of incidence on the surface of the light guide that acts as the optical interface, and wherein the angle of incidence is higher than a critical angle for total internal reflection when liquid is not present at the optical interface.

6. The electronic cigarette of claim 5, wherein the light guide is oriented so that light from the vaporising light source is reflected by the light guide and directed towards the optical interface at the angle of incidence.

7. The electronic cigarette of claim 5, wherein totally internally reflected light from the optical interface is directed towards a second surface of the light guide, and wherein an angle of incidence at the second surface is lower than a critical angle for total internal reflection so that light is refracted at the second surface, away from the light guide.

8. The electronic cigarette of claim 5, wherein the angle of incidence is lower than the critical angle for total internal reflection when liquid is present at the optical interface.

9. The electronic cigarette of claim 3, wherein a gap is provided between the light guide and the first absorber at the optical interface, and wherein the flow path can allow vaporisable liquid to flow into the gap.

10. The electronic cigarette of claim 1, comprising a second absorber for receiving light reflected away from a wick at the optical interface.

11. The electronic cigarette of claim 1, further comprising a sensor for detecting a presence of light coupled away from the optical interface and for providing a feedback control signal for the vaporising light source.

12. The electronic cigarette of claim 1, comprising an airflow channel provided between an air inlet and a mouthpiece, wherein the first absorber is provided in or adjacent the airflow channel so that vaporised liquid can be provided to an airflow passing through the airflow channel and inhaled by a user, and wherein the vaporising light source is provided in or adjacent the airflow channel at a position between the first absorber and the air inlet so that the airflow can be heated by the vaporising light source.

13. The electronic cigarette of claim 1, wherein the vaporising light source is a laser.

14. A consumable for the electronic cigarette of claim 1 comprising:
   a housing having a bottom portion configured for engagement with an electronic cigarette device,
   the reservoir for storing a vaporisable liquid being disposed within the consumable,
   the first absorber being a fluid-permeable absorber arranged in fluid connection with the reservoir, wherein the first absorber is disposed within the consumable; and
   a through-channel extending from an opening in the housing to a vapor outlet, wherein the first absorber is located in the through-channel so that air flows through or past the first absorber from the opening in the housing to the vapor outlet.

15. The consumable of claim 14, wherein the first absorber is provided with extending projections which extend into inlets of the reservoir, respectively.

16. The consumable of claim 15, wherein a cross-sectional area of each of the extending projections is smaller than a cross-sectional area of each of the inlets of the reservoir, respectively.

17. The consumable of claim 14, wherein the housing is provided with an annular flange configured to space the bottom portion of the housing at a distance from an interior surface in the electronic cigarette.

18. A method of operating an electronic cigarette comprising the steps of:
   storing a vaporisable liquid in a reservoir;
   providing a vaporising light source and an optical interface between the vaporising light source and a first absorber;
   providing a flow path for liquid in the reservoir towards the absorber and the optical interface;
   emitting light from the vaporising light source towards the optical interface; and
   selectively reflecting or refracting light emitted by the vaporising light source at the optical interface so that light emitted by the vaporising light source is coupled towards the first absorber when liquid is present at the optical interface and light emitted by the vaporising light source is coupled away from the first absorber when liquid is not present at the optical interface, wherein the first absorber generates heat that can vaporise the vaporisable liquid by absorbing light from the vaporising light source.

19. A consumable for an electronic cigarette comprising:
   a housing having a bottom portion configured for engagement with an electronic cigarette device,
   a reservoir for storing a vaporisable liquid,
   a fluid-permeable absorber arranged in fluid connection with the reservoir; and
   a through-channel extending from an opening in the housing to a vapor outlet, wherein the absorber is located in the through-channel so that air flows either through the absorber or through and past the absorber from the opening in the housing to the vapor outlet.

* * * * *